United States Patent
Fransham et al.

(10) Patent No.: US 10,513,660 B2
(45) Date of Patent: Dec. 24, 2019

(54) COMPACT FAST PYROLYSIS SYSTEM FOR CONVERSION OF CARBONACEOUS MATERIALS TO LIQUID, SOLID AND GAS

(71) Applicant: ABRI-Tech Inc., Namur, Quebec (CA)

(72) Inventors: Peter Fransham, Ottawa (CA); Cory Leggett, St-Emile de Suffolk (CA); Henry Leggett, Namur (CA)

(73) Assignee: ABRI-TECH INC., Namur (CA)

( * ) Notice: Subject to any disclaimer, the term of this patent is extended or adjusted under 35 U.S.C. 154(b) by 0 days.

(21) Appl. No.: 15/645,450

(22) Filed: Jul. 10, 2017

(65) Prior Publication Data
US 2017/0306238 A1    Oct. 26, 2017

Related U.S. Application Data

(63) Continuation-in-part of application No. 13/946,678, filed on Jul. 19, 2013, now abandoned.

(51) Int. Cl.
| | |
|---|---|
| *C10B 49/16* | (2006.01) |
| *C10B 53/02* | (2006.01) |
| *C10B 49/18* | (2006.01) |
| *C10B 7/10* | (2006.01) |

(52) U.S. Cl.
CPC ............ *C10B 49/18* (2013.01); *C10B 7/10* (2013.01); *C10B 49/16* (2013.01); *C10B 53/02* (2013.01); *Y02E 50/14* (2013.01)

(58) Field of Classification Search
CPC ......... C10B 49/16; C10B 49/18; C10B 47/44; C10B 7/10; C10B 53/02; B29C 2043/325; B29C 2043/3294; B29C 47/0825; B29C 47/6025; B65G 33/22; B65G 33/24
See application file for complete search history.

(56) References Cited

U.S. PATENT DOCUMENTS

| | | | |
|---|---|---|---|
| 1,712,082 A | 5/1929 | Koppers | |
| 4,123,332 A * | 10/1978 | Rotter | ............ C10B 7/10 201/15 |
| 5,017,269 A * | 5/1991 | Loomans | ............ C10B 7/10 201/25 |
| 9,631,145 B2 | 4/2017 | Freel | |
| 2008/0006520 A1 | 1/2008 | Badger | |
| 2009/0218209 A1 | 9/2009 | Poulleau | |
| 2010/0163395 A1 | 7/2010 | Henrich | |
| 2012/0285814 A1 | 11/2012 | Del Monte | |

FOREIGN PATENT DOCUMENTS

| | | |
|---|---|---|
| CA | 2255922 | 11/1997 |
| CA | 2351892 | 12/2002 |
| EP | 1354172 | 8/2004 |
| WO | 91/11499 | 8/1991 |

\* cited by examiner

*Primary Examiner* — Jonathan Miller
*Assistant Examiner* — Jonathan Luke Pilcher
(74) *Attorney, Agent, or Firm* — Greer, Burns & Crain, Ltd.

(57) ABSTRACT

An apparatus for pyrolysis of organic material biomass, including: i) a first, horizontal auger tube having inlet for a heat carrier and a second inlet for biomass; and a first outlet for pyrolysis gas and a second outlet for the heat carrier and transformed biomass; ii) a second, inclined auger tube having an inlet at or below the second outlet of the first auger tube, for receiving the heat carrier and transformed biomass from the second outlet of the first auger tube and an outlet at a level above the inlet thereof, the outlet communicating with the first inlet of the first auger tube to deliver heat carrier thereto.

6 Claims, 4 Drawing Sheets

COMPACT FAST PYROLYSIS SYSTEM FOR CONVERSION OF CARBONACEOUS MATERIALS TO LIQUID, SOLID AND GAS

RELATED APPLICATIONS

This application is a continuation in part of U.S. patent application Ser. No. 13/946,678 filed on Oct. 24, 2013, the entirety of which is incorporated by reference.

FIELD OF THE DISCLOSURE

The present invention relates to the field of biomass pyrolysis, and provides a compact, substantially self-contained fast pyrolysis system and apparatus for conversion of biomass into solid, liquid and gas pyrolysis products.

BACKGROUND

Biomass pyrolysis in itself is not a new technology and the literature abounds with examples of various types of pyrolysis units. It is generally accepted that biomass pyrolysis can be carried out in either a fast mode or a slow mode. The fast mode maximizes liquid yield, while the slow mode maximizes solid (charcoal) yield. Lede (2013) published an extensive review and description of fast pyrolysis systems. Freel (2017) compiled an extensive list of references as part of U.S. Pat. No. 9,631,145.The extensive reference list is testimony to the volume of literature available on pyrolysis. The following is a list of fast pyrolysis processes including but not restricted to circulating bed (Freel), fluid bed (Piskorz et al,) twin auger (Brown, Henrich et al) or single auger (Hornung, Fransham) Virtually all fast pyrolysis systems involve mixing the biomass with a heat carrier. Silica sand is the most often used, although steel shot (Fransham), steel balls (Hornung, Poulleau et al) or ceramic shot is used in most auger pyrolysis. When the heat carrier is circulated with recycled gas, sand is the heat carrier of choice. The general object of fast pyrolysis is to drive off volatiles from biomass material and condense them in a matter of seconds. Slow pyrolysis processes include augers (Flottvik, Poulleau et al), multiple hearth and batch systems used in the coking industry. Slow pyrolysis systems do not generally use a heat carrier and is generally carried out in a matter of minutes. People skilled in the art will recognize that other possible processes also exist for conducting pyrolysis.

Circulating bed type fast pyrolysis systems (Freel) also known as transport bed processes involve moving sand vertically in a tube at velocities in the order of 20 m/sec. The motivating gas is oxygen free recycled gas obtained after all of the condensable volatiles have been stripped from the non-condensing gas. Biomass enters the vertical tube at a point above the base of the tube. The biomass mixes with the sand in the tube and the volatile matter in the biomass is converted to a hot gas. There are however, fundamental problems with transport beds. The first is the use of sand as a heat carrier. Sand has a low thermal conductivity and the sand temperature has to be high enough to transfer sufficient energy to raise the biomass temperature to approximately 515° C. However, the short contact time and the low thermal conductivity of sand mean that only a fraction of the energy contained in the sand grain can be transferred to the biomass. Also, the large amount of recycled gas that is required for transport is a parasitic load on the system. The gas has to be heated and cooled for each cycle. Condensers have to be large enough to handle the heat load in the gas stream. The excessive electrical energy required to transport sand several meters vertically in the air at velocities of about 20 m/sec. greatly reduces the efficiency of the process.

Furthermore, the sand and biomass are in a dispersed low density mixture of sand, biomass and motivating gas. Heat transfer from the sand to the biomass is predicated on the random contact between the sand grains and the biomass particles.

Fluid bed pyrolysis processes have similar short comings to circulating bed reactors. Fluid beds have to be shallow to ensure short vapour residence times required to limit secondary chemical reactions. Preventing carryover of the sand into the char recovery circuit requires balancing of sand size and airflow. A further limitation is the transferring of heat into the bed. The only ability to do pyrolysis work is dictated by the mass of gas multiplied by the temperature differential between the incoming and exiting recycle gas multiplied by the specific heat of the recycle gas. Large blowers are required to move the recycled fluidizing gas. The key technical challenge is to scale up the reactor to meet the demands of short residence time while maintaining the sand in the reactor. The sand in the fluid bed is in a low density medium and contact between the sand particle and the incoming biomass relies on rapid mixing before a large bubble of gas rises to the bed surface and expands outwardly. There is therefore a considerable technical challenge to feeding biomass into large reactors and separating reacted biomass (charcoal) from sand. Attempts have been made to scale up fluid bed reactors for pyrolysis. No biofuel pyrolysis plant is currently operating at a commercial scale using this technology.

Auger pyrolysis offers a solution to the deficiencies in the fluid bed and circulating bed processes. Steel shot has a higher thermal conductivity than sand and hence more energy can be transferred at a lower operating temperature from the shot to the biomass in an equivalent period of time as compared to sand reactors. Fransham (2001) developed an auger system whereby the shot was recirculated via a bucket elevator. The charcoal and non-condensing gases were burned to provide process heat. The system relied on pressure from the expanding raw pyrolysis gas and the volume reduction in the gas at the first stage condensing unit to move the gas from the reactor to the condensers with a residence time similar to that of the other pyrolysis systems. The advantage of the auger system is the biomass is in close contact with the heat carrier and hence high heating rates are achieved. The use of steel shot over sand significantly reduces auger wear and heat carrier attrition when compared to sand filled reactors.

Hornung used hollow steel balls to rapidly pyrolyze biomass and separated the charcoal from the balls in a trommel screen. The balls were heated and circulated in a system of screw conveyors. This system has been used for a variety of applications and numerous papers have been written and patents filed on results from this process. Poulleau et al developed a complex system of augers to move steel balls in a pyrolysis apparatus. The system requires controlled feeding of the steel balls into an auger reactor along with controlled biomass feeding. The biochar is separated through a screen. The steel balls are heated separately in a furnace. The apparatus is designed to produce a maximum amount of high calorific gas and by common definition is a gasifier and not a pyrolysis process to maximize biooil yield. Poulleau's apparatus uses an auger configuration that is more complicated than that of the present invention. The present invention, moreover, is a two stage pyrolysis system whereby pyrolysis occurs rapidly in the first auger and more slowly in the second auger. The advantage of the present invention is the maximization of liquid yield and minimization of biochar and non-condensable gas yield.

SUMMARY

Auger pyrolysis has been shown above to be an improvement on the fluid bed and circulating bed pyrolysis systems. This invention is an improvement and simplification of the auger pyrolysis system developed by Fransham (2001), Poullneau et al, Henrick et al and Brown. There are several unique features that have been added to the basic system. In a broad aspect, the present invention provides a pyrolysis system where the system consists of two reactors. The horizontal reactor removes most of the volatile matter while the second, inclined auger reactor, allows for a longer contact time and removal of the remaining volatile matter under slow pyrolysis conditions. Pollineau et al and Henrick et al both separate the biochar prior to the second auger and have reported approximately double the biochar production as compared to the present invention. In the present invention, the biochar and steel shot are heated to between 0 and 50° C. higher than the first auger temperature of between 400° C. and 550° C. This secondary heating further removes volatile matter from the biochar and increases the yield of condensable gas and non-condensable gas.

In a broad aspect, then, the present invention relates to an apparatus for pyrolysis of organic material biomass, comprising: (i) a first, horizontal auger tube having a first inlet for a heat carrier and a second inlet for biomass; and a first outlet for pyrolysis gas and a second outlet for said heat carrier and transformed biomass; (ii) said first auger tube containing an auger with a first section between said first inlet and said second inlet, and a second section between said second inlet and said second outlet, the first auger section having a pitch of between 25% and 75% auger diameter, and the second auger section having a pitch greater than that of the first section, whereby heat carrier deposited in the auger via the first inlet will be at a lower level in the second section, to permit the deposit of biomass in the auger at the second inlet; (iii) the first section of the first auger providing a vapor seal to prevent the escape of gas at the first inlet; (iv) a second, inclined auger tube having an inlet at or below the second outlet of said first auger tube, to receive the heat carrier and transformed biomass from the second outlet of the first auger tube, and having an auger therein; (v) the inclination of the second auger tube resulting in the second auger being full, to maintain a seal against the back flow of gas; and (vi) an outlet for the second auger at a level above the inlet thereof, said outlet communicating with the first inlet of the first auger tube to deliver heat carrier thereto.

DETAILED DESCRIPTION

Figure 1:
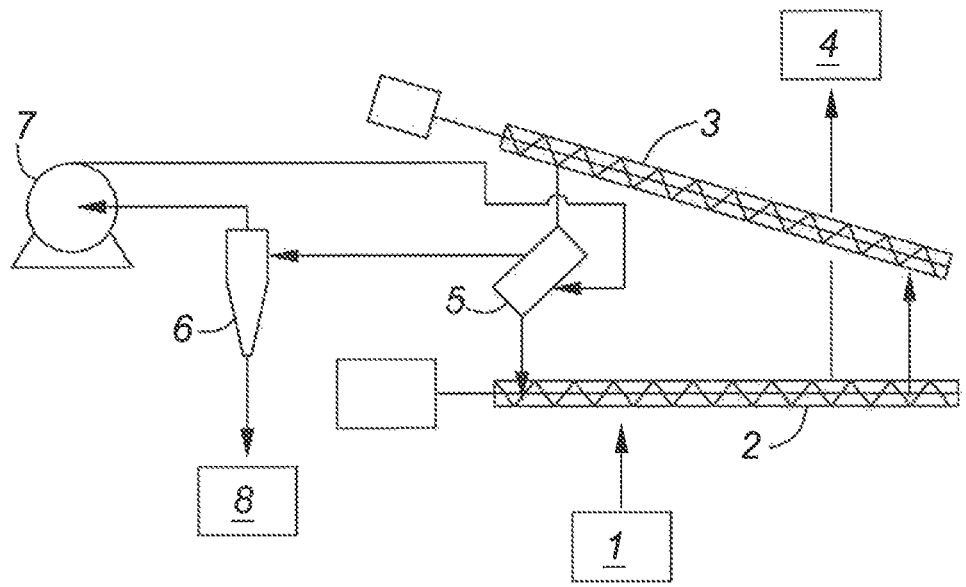
FIG. 1 is a schematic of the system of the present invention.

Referring first to the schematic diagram of FIG. 1, the basic components of the pyrolysis apparatus of the present invention are shown. A first reactor comprises first tube 2 containing a screw conveyor comprising an auger. First tube 2 provided with a first inlet for steel shot, and a second inlet for biomass feed, downstream of the first inlet.

Figure 2A:
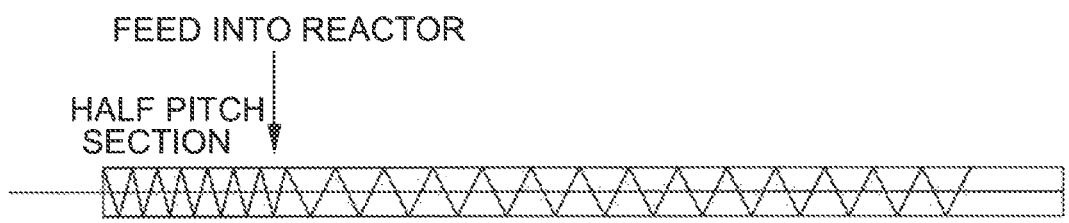
FIG. 2a is a schematic of an auger tube with and auger having a fine pitch at one end and a coarser pitch at the other end.
Figure 2B:
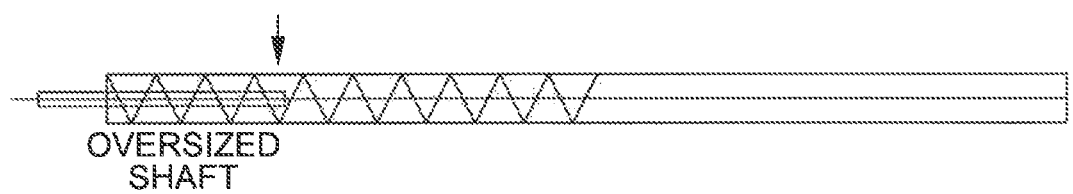
FIG. 2b is a schematic of an auger tube with an auger having a small effective carrying volume at one end, and a large effective carrying volume at the other end.

Steel shot with a temperature between 350° C. and 550° C. drops into the reactor conveyor tube (2). The level of shot is maintained higher than top elevation of the auger to ensure the auger is 100% full. The auger is turning at between 20 and 200 RPM with a preferred rotational speed of between 80 and 100 RPM. Feed enters the reactor from storage and can be conveyed to the reactor by an auger or series of augers or by any other means that will quickly introduce the biomass to the steel shot. The auger flighting pitch upstream of the feed entry point is set at ¼ to ¾ pitch, preferably ½ pitch. At the point of feed entry from (1) the pitch is increased to full or greater than full in such a manner that the shot level drops to approximately one-half full. The increase in pitch assures space is available for the biomass in the auger and that there is head space above the shot and biomass to allow the gas to flow down the auger and out to a condenser. An alternate means of controlling the shot level in the reactor is to increase the auger shaft size upstream of the feed point and maintain full pitch throughout the entire auger length. The shaft at the feed entry point is a smaller diameter and therefore the shot level will drop. FIG. 2a shows the half pitch auger while FIG. 2b shows the larger shaft auger. Both of these methods have been tested by the Applicant and found to perform identically.

The hot pyrolysis gas exits the reactor downstream of the feed entry point and is conveyed by a system of pipes to a condensation unit (4) where the gas is cooled and the condensable materials are removed. The charcoal and shot continue past the gas exit point and drop into a second conveyor tube (3) containing a screw conveyor comprising an auger. The second conveyor tube is inclined upwardly relative to the first tube. The inclined conveyor tube provides a physical seal between the first reactor (2) and a charcoal recovery system (5) as will be discussed. Heat transfer through the shell of the inclined tube provides a means of heating the steel shot up to the desired temperature.

The temperature of the recycled steel shot is governed by the temperature external to the reactor and inclined auger shells. The mean reaction temperature is a function of the shot temperature and the mass ratio of steel shot to biomass. The temperature differential between the external temperature and the desired reaction temperature is a function of the type of biomass and its moisture content. Empirical observations have shown the biomass is rapidly mixed into the steel shot in two revolutions of the auger. Sixty to one hundred and twenty revolutions per minute for the reactor auger appear to be adequate to provide total incorporation of the biomass into the steel shot in a matter of 1 second. Given the high thermal conductivity of steel shot and the rapid mixing, high liquid yields can be obtained for woody biomass within a temperature range of 350° C. to 500° C. The preferred temperature is a function of the type of biomass, the amount of volatile matter to remain in the biochar, the desired liquid yield and the physical properties of the biomass. Circulating bed type reactors are known to have an optimum temperature of 515° C. for similar biomass. Auger pyrolysis systems with a steel shot heat carrier are able to perform the same pyrolysis activity at a lower temperature and are hence more thermally efficient.

The heating of the charcoal in the second auger tube to a higher temperature than the primary reaction temperature can result in additional gas being produced. The amount of gas depends on the temperature of the shot following mixing with the biomass and the temperature to which the shot is heated in the inclined auger tube (3). At 400° C. primary reaction temperature, more volatile matter remains in the char and hence more gas is produced during heating in the inclined auger. As discussed below, the charcoal recovery system (5) is isolated from the reactor system (2), and therefore an increase in pressure will occur in the charcoal recovery system if pressure relief isn't available. Pressure relief is possible by allowing the excess gas to permeate through the shot at the entry point to the reaction auger tube (2). The size of the steel shot particles therefore is a factor in controlling pressure relief. If pyrolysis is conducted at 400° C. and more gas is produced, then the shot size has to be greater to allow for higher gas permeability. Steel shot with a grain size of 1 mm was found to be somewhat impervious to the excess gas given the length of the full section upstream of the feed entry point when the operating temperature was less than 450° C. Finer shot (1 mm) can be used if the length of the full section is shortened. The choice of shot size and the geometry of the reactor can both be used to govern the pressure in the char recovery circuit.

Figure 3:
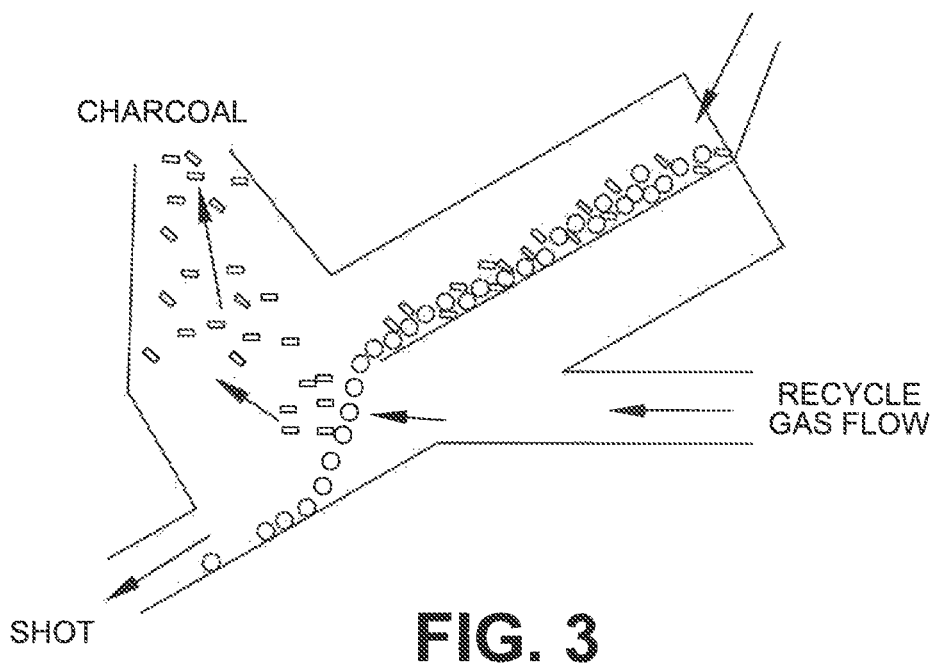
FIG. 3 is a schematic of a char/shot separator used in a preferred embodiment of the present invention.
Figure 4:
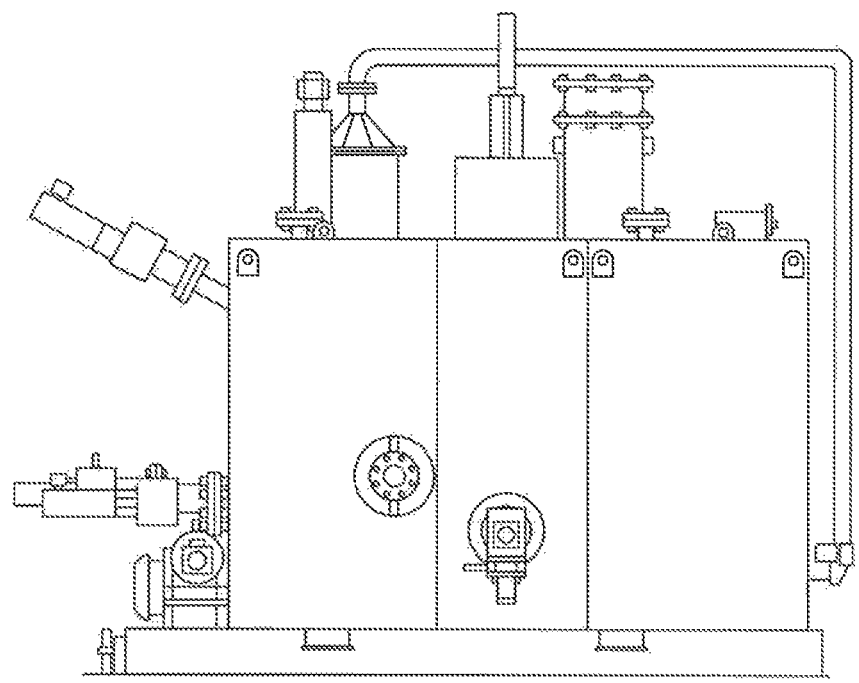
FIG. 4 is a front view of an embodiment of the present invention.

The shot exits the inclined tube and drops down a chute to a char/shot separator (5). The separator (5) is a simple classifier device who's only moving part is a small radial fan blower (7). Recycle gas classification is possible because of the density difference between the shot and the char particles. Steel has a density of 7.3 g/cc while charcoal particles are reported to have particle densities in the range of 1.5 to 1.7 gm/cc. The steel shot acts as a ball mill and post pyrolysis charcoal has a grain size normally less than 1 mm Referring to FIG. 3, the shot and char exit the upper end of the inclined auger tube and slide down an inclined plane and the combined mass drops over a step. Recycle gas from a blower (7) enters the separator from the back of the step and carries the char in the gas stream while the clean shot flows down an inclined plane and drops into a small surge bin at the start of the horizontal reactor tube (2). The charcoal is separated from the recycle gas stream via a cyclone (6). The charcoal exits the cyclone (6) and is conveyed to storage (8).

An advantage of the overall design of the system is in its compactness and simplicity. The reactor tube (2) and inclined tube (3) are located in parallel planes and the separator is small enough to fit between the two tubes. The apparatus has a small footprint per volume of biomass converted. Biooil yields of 70% have been measured. This yield is consistent with yields obtained by fluid bed and transport bed pyrolysis units. The simplicity and low capital cost and low operating cost per litre produced are unique to this invention.

Figure 5:
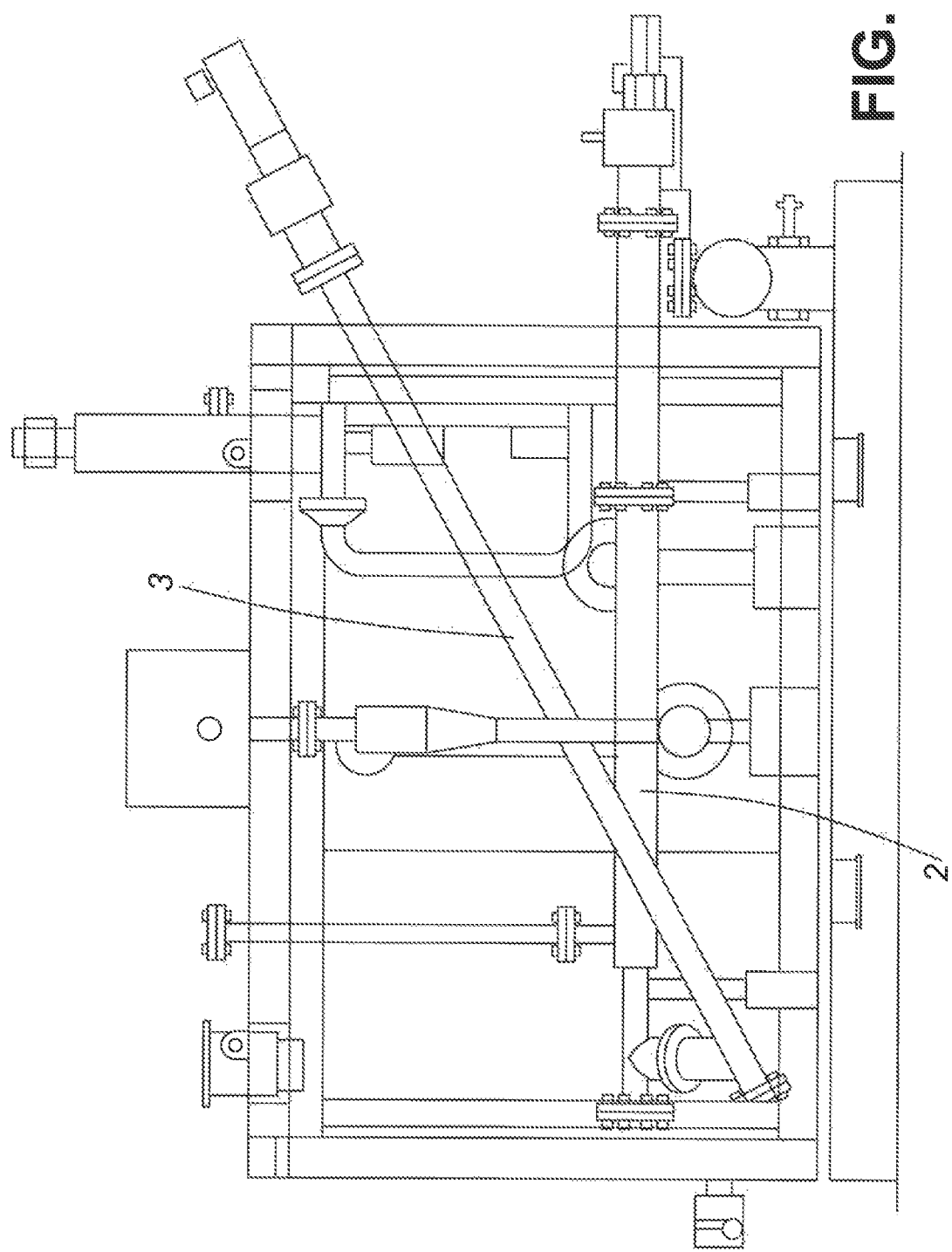
FIG. 5 is a rear view of the embodiment of the present invention shown in FIG. 4, with the outer panels removed.

Referring to FIG. 5, it will be observed that all essential parts of the closed loop of the present apparatus, namely the reactor tube 2, the chute between reactor tube and the inclined tube 3, and the separator 5 that connects the top of the inclined tube with the steel shot input of the reactor tube, are all contained within a rectangular box-like structure. For clarity, the side walls of the box and heat source are not shown, but in operation, insulated walls, entirely enclose the box, which includes a heat source therein creating an oven that can be maintained at a temperature suitable for conducting a pyrolysis reaction. Other portions of the system, such as the motors for turning the augers, and the hopper for biomass are located outside of the box.

EXPERIMENTAL RESULTS

Figure 6:
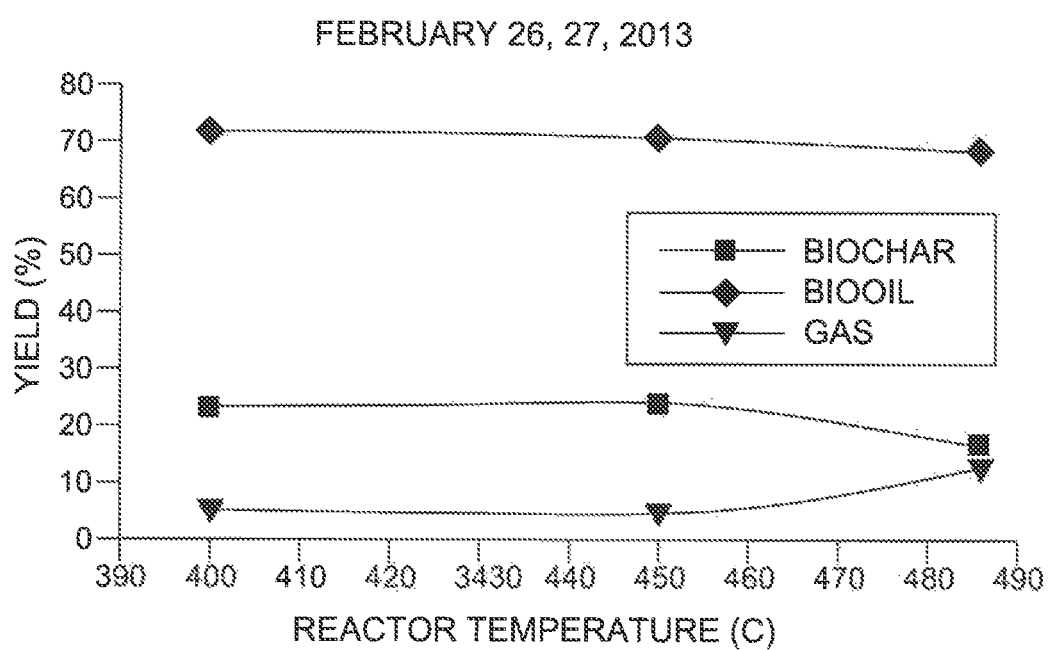
FIG. 6 is a graph of reaction temperature versus yield percent for different reactor products.

Three tests were performed to demonstrate the validity of auger pyrolysis. In theory the lower the reactor temperature, the higher the char yield. The system of the present invention is designed to produce biooil and char is a by-product. Normally the plant is operated with a reactor temperature between 450° C. and 500° C. In an attempt to maximize char yield the first test was run at 400° C., as illustrated in FIG. 6.

The results of the three tests are shown in the summary table and graph that are provided below.

| temperature | biochar | biooil | gas |
| --- | --- | --- | --- |
| 400 | 23.2 | 71.75 | 5.04 |
| 450 | 24.1 | 70.97 | 4.88 |
| 485 | 17.2 | 69.5 | 13.2 |

The key finding is the potential to conduct fast pyrolysis at temperatures in the low 400° C. range.

REFERENCES

1) J. Lédé, Oil & Gas Science and Technology—Rev. IFP Energies Nouvelles, Copyright Ó 2013, IFP Energies Nouvelles DOI: 10.2516/ogst/2013108
2) Brown, J. N., DEVELOPMENT OF A LAB-SCALE AUGER REACTOR FOR BIOMASS FAST PYROLYSIS AND PROCESS OPTIMIZATION USING RESPONSE SURFACE METHODOLOGY, M.S. thesis, Iowa State University, Ames, 2009.
3) Hornung et al., 2001, PLANT FOR THE THERMAL TREATMENT OF MATERIAL AND OPERATION PROCESS THEREOF, EP 1354172 B1.
4) Piskorz, Jan, Piotr Majerski, and Desmond Radlein, ENERGY EFFICIENT LIQUEFACTION OF BIOMATERIALS BY THERMOLYSIS, CA 2255922.
5) A. Barry Freel, RAPID THERMAL CONVERSION OF BIOMASS, CA 2705775, and Method and apparatus for a circulating bed transport fast pyrolysis reactor system, EP 0513051 B1.
6) Fransham, Peter, PROCESS FOR THE CONVERSION OF CARBONACEOUS FEEDSTOCK INTO LIQUID, CHAR AND GAS, CA 2351892.
7) Henrick, Edmund et al., METHOD FOR THE RAPID PYROLYSIS OF LIGNOCELLULOSE, US Patent Application 2010/0163395.
8) Poulleau, Gerard et al., THERMOLYSIS OF ORGANIC WASTE IN A BALL FURNACE, US Patent Application 2009/0218209.
9) Freel, Barry, RAPID THERMAL CONVERSION OF BIOMASS, U.S. Pat. No. 9,631,145.

The invention claimed is:
1. An apparatus for pyrolysis of organic material biomass, comprising:
  i) a first, horizontal auger tube having a first inlet for a heat carrier and a second inlet for biomass; and a first outlet for pyrolysis gas and a second outlet for said heat carrier and transformed biomass;
  ii) said first auger tube containing an auger with a first section between said first inlet and said second inlet, and a second section between said second inlet and said second outlet, the first auger section having a pitch of between 25% and 75% auger diameter, and the second auger section having a pitch greater than that of the first section, whereby heat carrier deposited in the auger via the first inlet will be at a lower level in the second section, to permit the deposit of biomass in the auger at the second inlet;

iii) the first section of the first auger providing a vapor seal to prevent the escape of gas at the first inlet;

iv) a second, inclined auger tube having an inlet at or below the second outlet of said first auger tube, to receive the heat carrier and transformed biomass from the second outlet of the first auger tube, and having an auger therein;

v) Wherein the inclination of the second auger results in heat carrier and transformed biomass in the second auger tube creating a full auger and a seal against the backflow of gas;

vi) an outlet for the second auger at a level above the inlet thereof, said outlet communicating with the first inlet of the first auger tube to deliver heat carrier thereto.

2. The apparatus as claimed in claim 1, wherein said outlet of said second auger is connected to the first inlet of said first auger tube via a classifier, whereby transformed biomass exiting from the outlet of said second auger tube with said heat carrier is separated from said heat carrier, and said heat carrier then enters said first auger tube reheated and free of transformed biomass.

3. The apparatus as claimed in claim 1, where the heat carrier and transformed biomass are heated in the second inclined auger to a temperature between 0° and 50° C. higher than a temperature of the first auger, wherein the temperature of the first auger is between 400° and 550° C., and wherein the heating in the second inclined auger causes removal of volatile matter from the transformed biomass and increases a yield of condensable gas and non-condensable gas.

4. The apparatus as claimed in claim 2, contained in a heat and gas proof enclosure defining an oven, provided with a heat source.

5. The apparatus as claimed in claim 4, wherein the first auger tube discharges heat carrier and converted biomass into the inlet of the second inclined auger tube and the second inclined auger tube discharges into the inlet of the classifier, which in turn discharges only heat carrier into the first inlet of the first tube in such a fashion as the heat carrier contained within the auger tubes is recycled continuously with no external addition of heat carrier.

6. The apparatus as claimed in claim 4, wherein the first auger tube discharges into the inlet of the second inclined auger tube and the second inclined auger tube discharges into an inlet of a classifier, which in turn discharges into the inlet of the first tube in such a fashion as to form a combined system, whereby the heat carrier contained within the auger tubes is recycled continuously with no external supply of heat carrier.

* * * * *